(12) United States Patent
Sheidler et al.

(10) Patent No.: US 8,781,694 B1
(45) Date of Patent: Jul. 15, 2014

(54) COMBINE HARVESTER DRIVE SYSTEM

(71) Applicant: Deere & Company, Moline, IL (US)

(72) Inventors: Alan D Sheidler, Moline, IL (US); Dennis M Roe, Coal Valley, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/768,376

(22) Filed: Feb. 15, 2013

(51) Int. Cl.
*A01D 34/00* (2006.01)
*G06F 7/00* (2006.01)
*A01D 41/127* (2006.01)
*A01D 43/10* (2006.01)
*A01D 69/08* (2006.01)
*F02D 29/00* (2006.01)
*F02D 31/00* (2006.01)
*F16D 19/00* (2006.01)

(52) U.S. Cl.
CPC .......... *A01D 41/1274* (2013.01); *A01D 43/105* (2013.01); *A01D 69/08* (2013.01); *A01D 41/1276* (2013.01); *F02D 29/00* (2013.01); *F02D 31/009* (2013.01); *F02D 2200/50* (2013.01); *F16D 19/00* (2013.01); *F16D 2500/5043* (2013.01); *F16D 2500/111* (2013.01); *F16D 2500/3067* (2013.01)
USPC ................ 701/50; 56/11.1; 56/11.5; 56/11.7; 56/14.8

(58) Field of Classification Search
CPC . A01D 41/127; A01D 41/1274; A01D 4/105; A01D 69/08; A01D 41/1276; A01B 61/00; F02D 29/00; F02D 31/009; F02D 2200/50; F16D 19/00; F16D 2500/5043; F16D 2500/111; F16D 2500/3067; F16H 2059/366
USPC ...... 701/50; 56/10.2 R, 10.2 A, 10.2 G, 10.8, 56/11.7, 14.7, 16.7, 11.4, 11.5, 14.8, 11.1
See application file for complete search history.

(56) References Cited

U.S. PATENT DOCUMENTS

| | | | |
|---|---|---|---|
| 3,633,359 A * | 1/1972 | Worn | 60/463 |
| 5,873,227 A * | 2/1999 | Arner | 56/14.6 |
| 5,995,895 A * | 11/1999 | Watt et al. | 701/50 |
| 6,695,693 B2 * | 2/2004 | Ho et al. | 460/6 |
| 6,702,666 B2 * | 3/2004 | Ho et al. | 460/6 |
| 7,427,231 B2 * | 9/2008 | Brome et al. | 460/1 |
| 7,632,179 B2 * | 12/2009 | Brome et al. | 460/6 |
| 7,788,889 B2 * | 9/2010 | Sheidler | 56/10.7 |
| 7,921,626 B2 * | 4/2011 | Maertens et al. | 56/10.2 R |
| 7,945,378 B2 * | 5/2011 | Sheidler et al. | 701/110 |
| 7,974,757 B2 * | 7/2011 | Mackin et al. | 701/50 |
| 7,992,370 B2 * | 8/2011 | Sheidler et al. | 56/10.7 |
| 8,074,433 B2 * | 12/2011 | Sheidler et al. | 56/10.7 |
| 8,087,900 B2 * | 1/2012 | Mackin et al. | 417/212 |
| 8,352,155 B2 * | 1/2013 | Schindler et al. | 701/103 |
| 8,417,424 B2 * | 4/2013 | Fujii et al. | 701/50 |
| 2008/0034720 A1 * | 2/2008 | Helfrich et al. | 56/10.2 R |

* cited by examiner

*Primary Examiner* — Russell Frejd

(57) ABSTRACT

A combine harvester (102) drive system switches between a first isochronous operating curve (622) and a second isochronous operating curve (628) of an isochronously governed engine (126) when a load on the combine harvester engine (126) reaches one or more threshold load conditions.

17 Claims, 6 Drawing Sheets

COMBINE HARVESTER DRIVE SYSTEM

FIELD

The field is combine harvesters. More particularly, the field is drive systems for combine harvesters.

BACKGROUND

Combine harvesters are machines to engineered to travel through agricultural fields at harvest time harvesting crops. They typically include a self-propelled vehicle upon which a harvesting head is mounted. The harvesting head extends across the front of the combine harvester and severs the stalks of the crop plants close to the surface of the ground.

The harvesting head severs at least a portion of the plants from the ground, gathers the severed portions together, and conveys them into the body of the combine harvester itself for further processing.

The combine harvester performs three basic processing functions: threshing, separating, and cleaning. The combine harvester also stores the grain until it can be unloaded from the combine harvester.

The threshing and separating are performed by a cylindrical rotor disposed inside a closely spaced concave. The concave is a hollow and generally cylindrical-shaped structure that surrounds the rotor.

A narrow gap is provided between the rotor and the concave. The severed crop matter is introduced into this gap at a forward end of the rotor and concave. As the rotor rotates against the stationary concave, it threshes the crop, and separates the grain from the material other than grain (MOG) such as leaves, stalks, husks, and cobs.

The frictional drag between the rotor and the concave is significant, particularly when the gap between the rotor and the concave is filled with crop material.

For optimum performance, it is beneficial that the rotor rotates at a constant speed. The load on the engine changes, however, making it difficult to keep the rotor operating at a constant speed. As the combine harvester moves up and down hills, or encounters heavier crop that forms a thicker layer between the rotor and the concave, the power required to rotate the rotor can increase substantially.

In a typical combine harvester, a direct mechanical connection (i.e. the power transmission path) with a fixed rotational speed ratio is provided between the engine and the rotor. Furthermore, the rotor and the engine run at constant relative speeds with respect to each other. In normal operation, the operator operates the combine at its maximum possible speed to harvest a crop as fast as possible. The engine is controlled to operate at a constant and (typically) high speed. The speed of the engine is typically around 2000 to 2200 RPM when the combine harvester is operating at full speed.

There are drawbacks to this conventional mode of operation. For one thing, operating at maximum engine speed prevents the engine from operating in its most fuel-efficient operating zone, which is typically (for internal combustion engines) anywhere from 50% to 80% of the engine's maximum operating speed.

As a result, even when the load on the engine is relatively light, the engine is kept operating at a high speed that is fuel-inefficient. The engine could be operated at a lower and more fuel-efficient speed. However, due to the direct connection between the engine and the rotor, the rotor would also run slower, and the ground speed of the combine harvester would have to be reduced to prevent the rotor from being overloaded. Thus, operating the engine in a more efficient region at a proportionately lower speed requires that productivity be decreased by a similar proportion. There would be little need for this, however, if there were a way to switch the engine to a lower, more efficient speed, while maintaining a high rotor speed.

What is needed, therefore, is a new combine harvester drive system for driving the rotor of a combine harvester that will permit the engine speed to automatically change from a high-speed/fuel inefficient region to a lower speed/fuel-efficient region while keeping the rotational speed of the rotor substantially constant.

It is an object of this invention to provide such a system.

SUMMARY

In one arrangement, a combine harvester drive system switches between two engine power curves of an isochronously governed engine when the engine load reaches a threshold load condition.

In another arrangement, a combine harvester drive system automatically changes the speed of the engine as a function of engine load, both to a higher and to a lower speed, while keeping the speed of the threshing rotor the same.

In another arrangement, a combine harvester has an engine coupled to a multiple speed gearbox, which in turn is coupled to a threshing rotor. The gearbox permits the engine to engage the threshing rotor in at least two distinct gear ratios.

In one mode of operation, the operator can selectively change this gear ratio. In another mode of operation, an electronic control unit (ECU) automatically changes the gear ratio based upon a predetermined vehicle condition. This predetermined vehicle condition may include the load applied to the engine. This predetermined vehicle condition may include a calculation of engine operating efficiency.

The gearbox includes a plurality of clutches, the plurality of clutches include a first clutch that is engaged when the gearbox is engaged in one of the two distinct gear ratios. The plurality of clutches include a second clutch that is engaged with the gearbox is engaged in another of the two distinct gear ratios.

The combine harvester includes a plurality of drive wheels. The drive wheels are driven by a hydrostatic drive system. The hydrostatic drive system is driven by the engine through the gearbox.

The combine harvester further includes drive members. The drive members are driven by the gearbox. The drive members are configured to engage a straw chopper and an unloading system.

In another arrangement a combine harvester drive system comprises an engine, a governor coupled to the engine to control the speed of the engine based upon a speed signal, a first clutch coupled to the engine to be driven by the engine, a second clutch coupled to the engine in parallel to the first clutch to be driven by the engine, a threshing rotor coupled to the first clutch and the second clutch to be driven thereby, and an ECU coupled to the first clutch and the second clutch to selectively engage and disengage the first clutch and the second clutch, and coupled to the governor to transmit a speed command to the governor, and wherein the ECU is configured to engage one of the first clutch and the second clutch and to disengage the other of the first clutch and the second clutch when the engine reaches a first predetermined load level.

The first clutch and the second clutch may be disposed inside a gearbox.

The governor may be configured to isochronously control the engine over a range of operating loads.

The governor may be configured to receive the speed signal from the ECU.

The ECU may be configured to command one of the clutches to engage and to command another of the clutches to disengage, and to command the governor to change the speed of the engine by at least 200 RPM, at predetermined intervals such that the engaging, the disengaging, and the engine speed changing occur within a two second interval.

The combine harvester drive system may further comprise an operator input device coupled to the ECU.

The ECU may be configured to command the engagement of the first clutch, command the disengagement of the second clutch, and command the governor to decrease a speed of the engine upon operator manipulation of the operator input device.

The ECU may be configured to command the disengagement of the first clutch, may command the engagement of the second clutch, and may command the governor to increase the speed of the engine upon operator manipulation of the operator input device.

The ECU may be configured to automatically and periodically monitor an engine load condition.

The ECU may be configured (1) to engage the second clutch and (2) to disengage the first clutch and (3) to transmit a first speed command to the governor commanding the governor to increase the engine speed, in response to the ECU determining that the engine load condition has exceeded a first threshold engine load condition.

The first speed command to the governor may be a command to control the engine at a first speed even while the load fluctuates on the engine (i.e. Isochronous governing of the engine speed).

The ECU may be configured (1) to disengage the second clutch and (2) to engage the first clutch and (3) to transmit a second speed command to the governor to decrease the engine speed, in response to the ECU determining that the engine load condition has dropped below a second threshold engine load condition.

The second speed command to the governor may be a command to control the engine at a second speed even while the load fluctuates on the engine (i.e. isochronous governing of the engine speed), the second speed being different from the third speed.

The first engine load condition may be indicative of a higher engine load than the second engine load condition.

The first speed command may represent and indicate an engine speed higher than the an engine speed represented and indicated by the second speed command.

A method of operating a combine harvester drive system of a combine harvester having an engine controlled by a governor configured to operate the engine isochronously is provided, the combine harvester further having a threshing rotor coupled to the engine, the combine harvester further having first power transmission path coupling the engine to the threshing rotor in a first ratio of rotational speed of the engine and rotational speed of the threshing rotor, and a second power transmission path coupling the engine to the threshing rotor in a second ratio of rotational speed of the engine and rotational speed of the threshing rotor wherein the first ratio is different from the second ratio, and further wherein ECU is coupled to the governor, the method comprising the steps of: the ECU automatically and periodically determining an engine load condition;
the ECU automatically and periodically determining whether the engine load condition has reached a first threshold engine load condition; and
the ECU switching from the first power transmission path to the second power transmission path when the engine load condition reaches the first threshold engine load condition.

The method may further include a step of the ECU transmitting a first engine speed command to the governor substantially simultaneously with the step of switching from the first power transmission path to the second power transmission path.

The method may further include the step of the ECU automatically and periodically determining whether the engine load condition is reached a second threshold engine load condition, and switching from the second power transmission path to the first power transmission path when the engine load condition reaches the second threshold engine load condition.

The method may also include the step of transmitting a second engine speed command to the governor substantially simultaneously with the step of switching from the second power transmission path to the first power transmission path.

DETAILED DESCRIPTION

Figure 1:
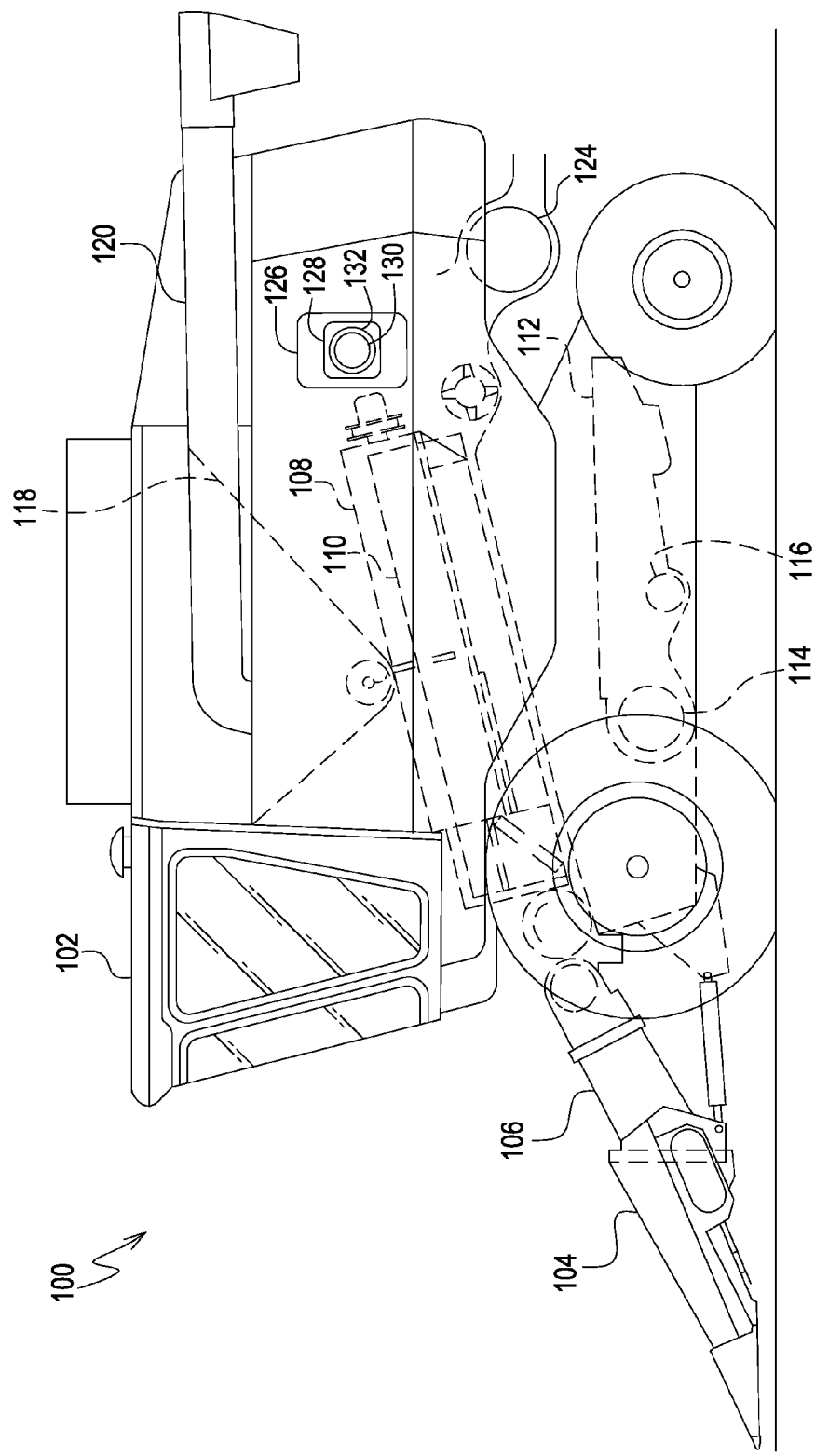
FIG. 1 is a side view of a combine harvester in accordance with the present invention.

A harvesting vehicle 100 includes a combine harvester 102 and a harvesting head 104. Harvesting head 104 is supported on the front of the combine harvester 102, resting upon and supported by a feederhouse 106 that is pivotally coupled to the front end of the combine harvester 102.

Crop material severed by the harvesting head 104 is conveyed rearward through an inclined conveyor in the feederhouse 106 into the body of the combine harvester 102. Once inside the body of the combine harvester 102, the crop material is directed into a gap between a threshing rotor 108 and a concave 110. The concave 110 partially surrounds the threshing rotor. The threshing rotor 108 has threshing elements (not shown) that engage the crop material that is drawn between the threshing elements and the concave 110, and separate the grain from the MOG.

The grain falls downward through apertures in the concave 110 into a cleaning shoe 112. A cleaning fan 114 is provided to blow air upward through screens in the cleaning shoe 112. This flow of air separates the grain from lighter MOG. The grain is permitted to fall downward through screens in the cleaning shoe 112 and onto the floor of the combine harvester 102.

The lighter MOG is carried rearward, where it is ejected from the combine harvester 102 and is spread over the ground.

The grain is carried upward by a transverse auger 116 and deposited in a grain tank 118. Periodically, a grain cart or truck pulls alongside the combine and an unloading conveyor 120 (in this case, an auger disposed inside a tube) conveys the grain from the grain tank 118 into the grain cart or truck. The MOG that is separated from the grain by the interaction of the threshing rotor 108 and the concave 110 is carried to the rear of the threshing rotor 108 and concave 110 and is conveyed to a chopper 124. The chopper 124 chops the MOG into smaller particles and distributes them over the ground.

An engine 126 is disposed in an upper rear portion of the combine harvester 102 in a position adjacent to the rear end of the threshing rotor 108. The engine 126 is coupled to and drives a gearbox 128, which in turn is coupled to and drives the threshing rotor 108, causing the threshing rotor 108 to rotate within the concave 110. The gearbox 128 includes a first drive member 130 and the second drive member 132 that are respectively coupled to and drive the chopper 124 and the unloading conveyor 120 by way of conventional mechanical transmission elements (not shown) such as hydraulic hoses, gears, shafts, pulleys and belts. These mechanical transmission elements have been removed for clarity of illustration.

Figure 2:
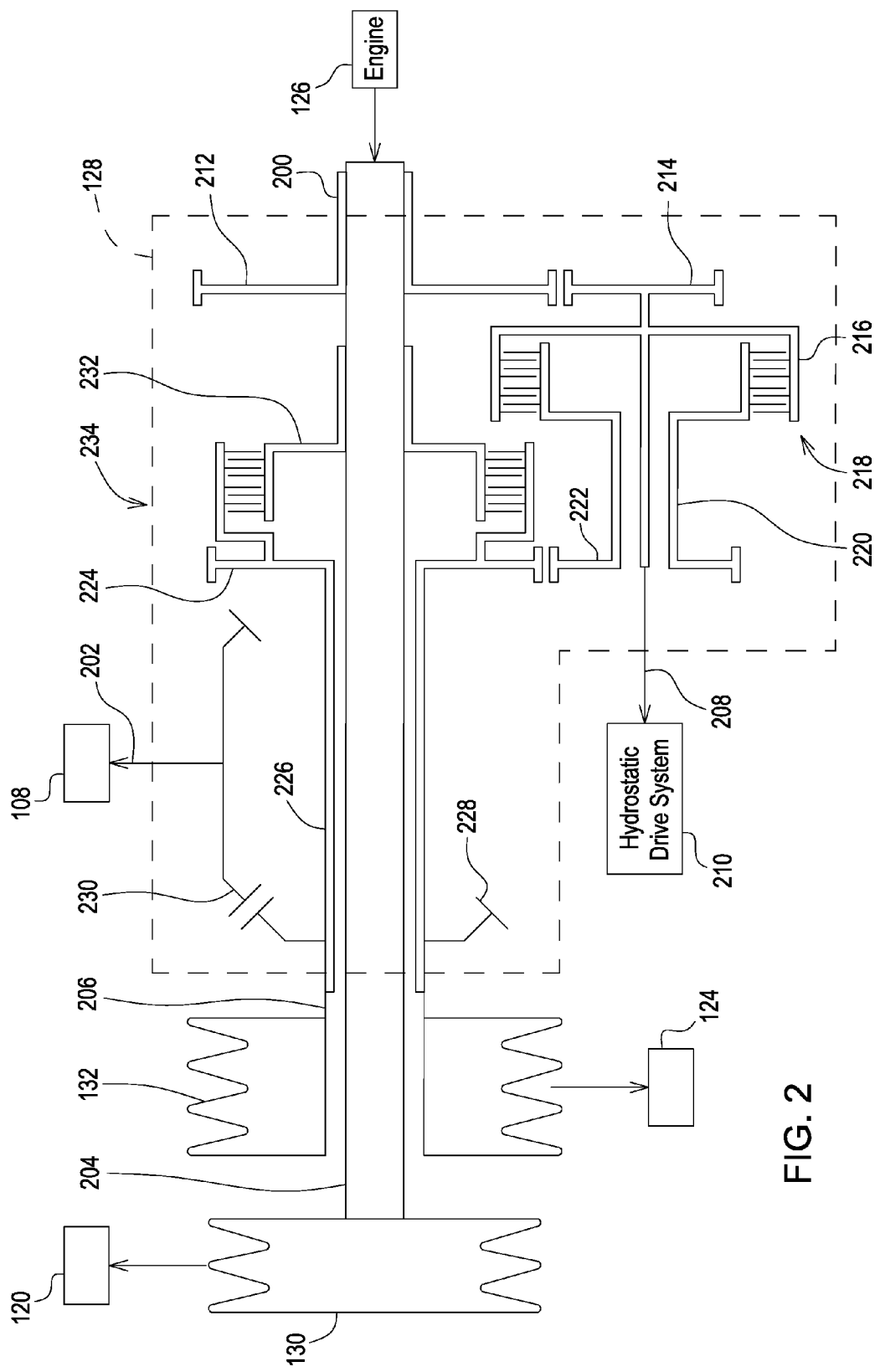
FIG. 2 is a schematic diagram of a gearbox provided in the combine harvester of FIG. 1.

Referring now to FIG. 2, engine 126 is coupled to an input shaft 200 extending from gearbox 128. The threshing rotor 108 is coupled to and driven by an output shaft 202 which extends from the gearbox 128. A first output shaft 204 and a second output shaft 206 both extend from gearbox 128. The first output shaft 204 is coupled to and drives the first drive member 130. The second drive member 132 is coupled by a belt (not shown) to the unloading conveyor 120 and drives the unloading conveyor 120. The second output shaft 206 is coupled to and drives the second drive member 132. The second drive member 132 is coupled by a belt (not shown) to the chopper 124 and drives the chopper 124. An output shaft 208 extends from the gearbox 128 and is coupled to a hydrostatic drive system 210, which in turn is coupled to the drive wheels (the two front wheels in FIG. 1) of the combine harvester 102.

A gear 212 is fixed to the input shaft 200. The gear 212 is engaged to and drives a gear 214. The gear 214 is fixed to and drives the input shaft 216 of a hydraulic clutch 218. The hydraulic clutch 218 has an output shaft 220 that is coupled to and drives a gear 222. The gear 222 drives the gear 224. The gear 224 is fixed to and drives a shaft 226.

The shaft 226 is fixed to and drives a gear 228. The gear 228 is engaged with and drives a gear 230. The gear 230 is fixed to and drives the output shaft 202. The shaft 226 is also fixed to and drives the second output shaft 206.

The input shaft 200 is also fixed to and drives an input member 232 of a hydraulic clutch 234. The hydraulic clutch 234 has an output member 236 that is coupled to and drives the gear 224.

By this arrangement, the engine 126 can be coupled to the shaft 226 in a first gear ratio by engaging the hydraulic clutch 218 or the engine 126 can be coupled to the shaft 226 in a second gear ratio by engaging the hydraulic clutch 234.

The first gear ratio and the second gear ratio are different. Thus, when the threshing rotor 108 is operating at a single speed, the engine can be operated at a first speed in the first gear ratio and at a second speed in the second gear ratio.

The hydraulic clutch 218 and the hydraulic clutch 234 are hydraulic or "wet" clutches. They are engaged and disengaged by being filled with pressurized hydraulic fluid or by releasing pressurized hydraulic fluid from the clutches.

When the hydraulic clutch 218 is engaged and the hydraulic clutch 234 is disengaged, power flows from the engine 126, through gear 212, through gear 214, through the hydraulic clutch 218, through gear 222, through gear 224, through the shaft 226, through gear 228, through gear 230, through the output shaft 202, and then to the threshing rotor 108.

When the hydraulic clutch 234 is engaged and the hydraulic clutch 218 is disengaged, power flows from the engine 126 through the hydraulic clutch 234, through the shaft 226, through gear 228, through gear 230, through the output shaft 202, and then to the threshing rotor 108.

Figure 3:
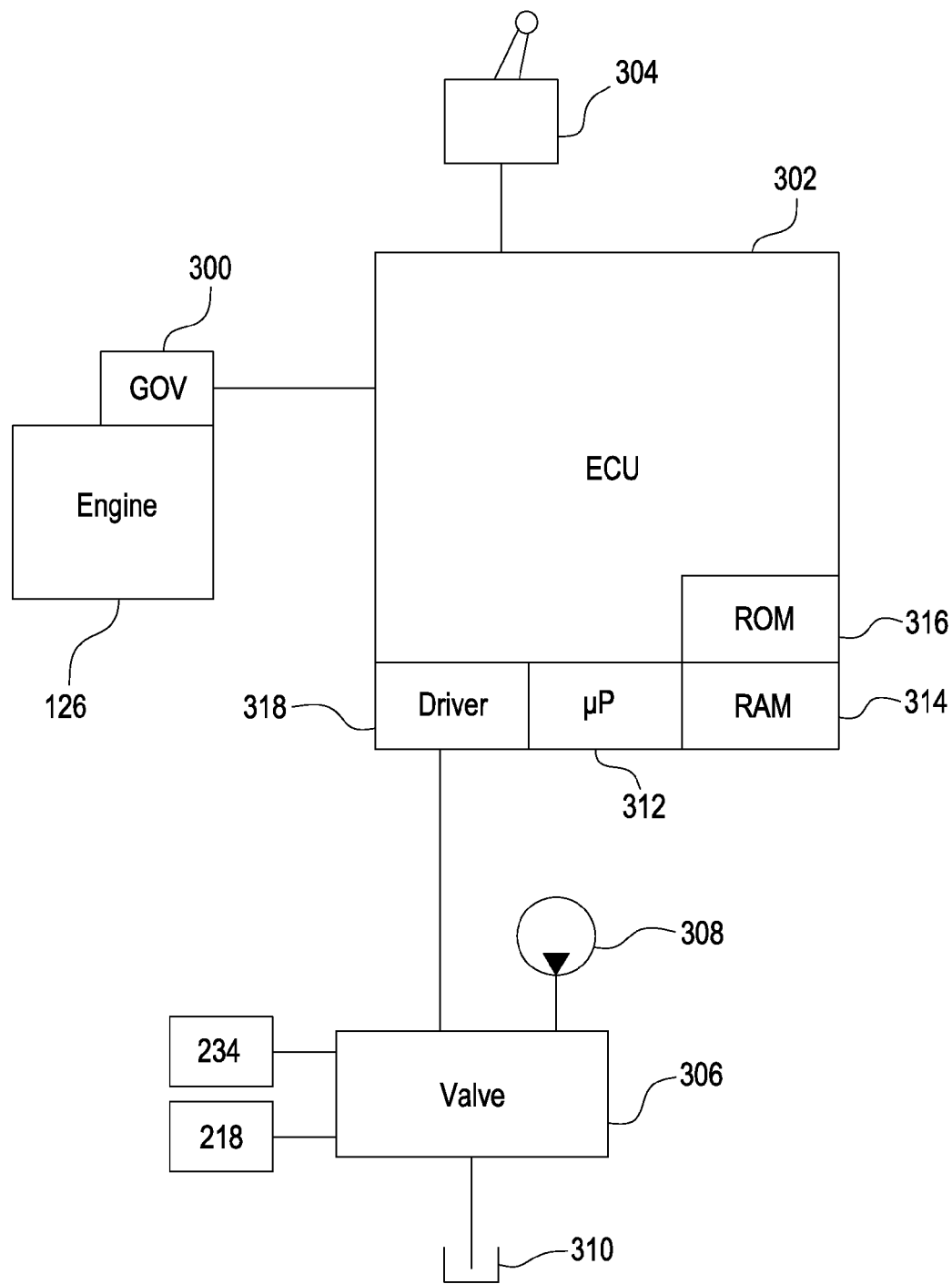
FIG. 3 is a schematic diagram of a control system for controlling the operation of the gearbox of FIG. 2.

Referring now to FIG. 3, an engine governor 300 (of the electronic type) is coupled to and controls the speed of the engine 126. The engine governor 300 is coupled to an electronic control unit (ECU) 302. The ECU 302 is coupled to an operator input device 304. The ECU 302 is also coupled to and operates a hydraulic valve 306. The hydraulic valve 306 is coupled to and receives hydraulic fluid under pressure from a hydraulic fluid source 308. The hydraulic valve 306 is also coupled to, and exhausts hydraulic fluid to, a hydraulic fluid reservoir 310. The hydraulic valve 306 controls the flow of hydraulic fluid both to and from the hydraulic clutch 218 and the hydraulic clutch 234. The ECU 302 is configured to signal the hydraulic valve 306 to conduct hydraulic fluid under pressure both to and from the hydraulic clutch 218 and the hydraulic clutch 234 under appropriate conditions determined by the control program that the ECU 302 executes and which is described in greater detail below.

The engine governor 300 is configured to receive signals from the ECU 302 indicating a desired operating speed of the engine 126. The engine governor 300 is configured to automatically regulate the speed of the engine 126 to the speed of the engine 126 indicated by ECU 302. The engine governor 300 is also configured to transmit signals to the ECU 302 indicating the actual speed of the engine 126 and the load on the engine 126.

The ECU 302 comprises a microprocessor 312, a random-access memory (RAM) 314, a read-only memory (ROM) 316, and a valve driver circuit 318. The microprocessor 312 is configured to execute a sequence of digital instructions that are stored in the read-only memory 316. The microprocessor 312 stores working values in the random-access memory 314 that the microprocessor 312 calculates during its programmed operation. The microprocessor 312 is configured to receive signals indicative of operator commands that are transmitted from the operator input device 304. The operator input device 304 is configured to be manipulated by the operator to generate these signals.

Figure 4:
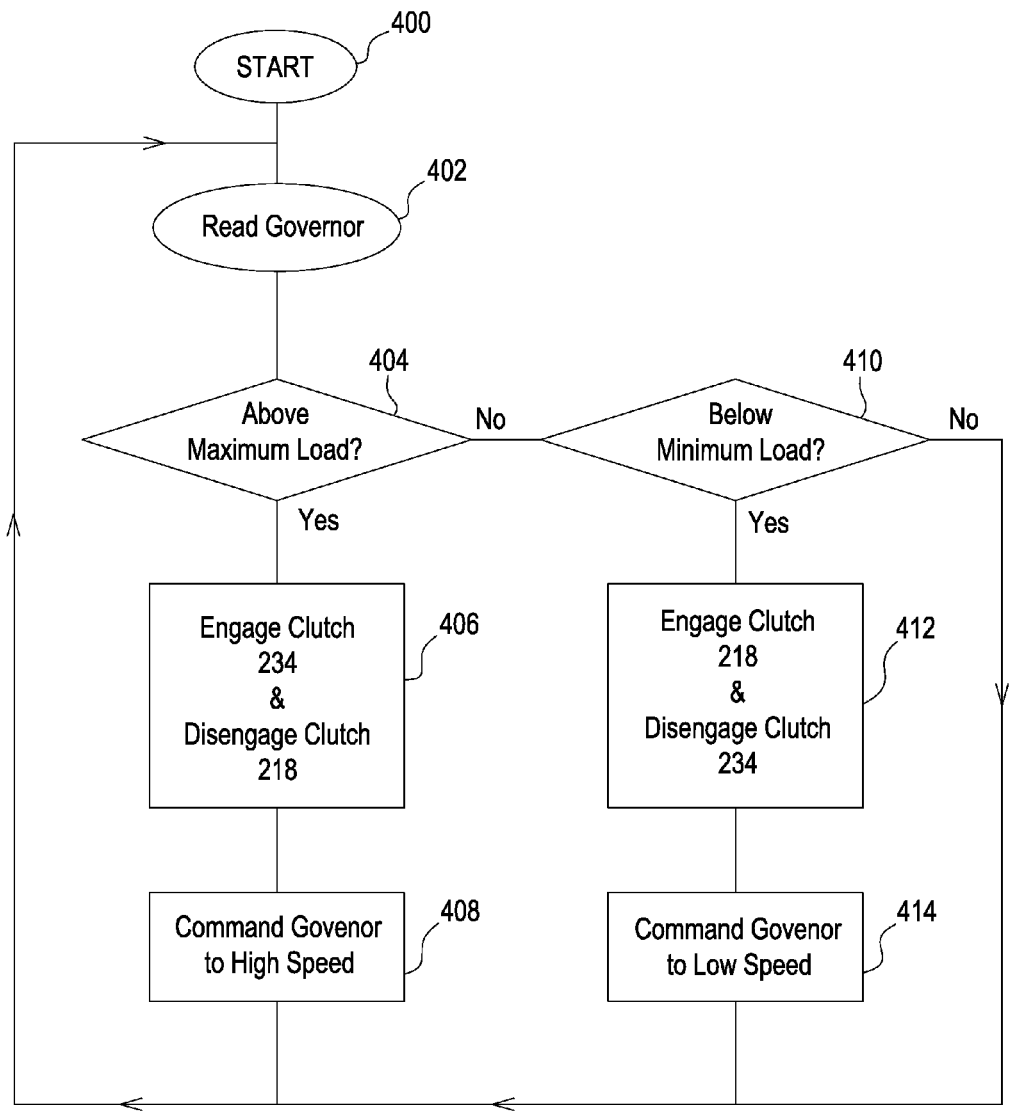
FIG. 4 is a flowchart of operation in a first, automatic mode of operation.

Referring now to FIG. 4, the ECU 302 follows a sequence of digital instructions stored in the read-only memory 316. These instructions cause the ECU 302 to perform the steps shown in FIG. 4. The steps shown in FIG. 4 are executed in a repeating cycle of instructions, each cycle of the instructions having a duration of between 10 and 250 ms before the instructions are repeated in the next cycle.

The process starts in step 400. In the next step, step 402, the ECU 302 reads a speed signal, indicating the speed of the engine 126 and a load signal, indicating the load on the engine 126 from the engine governor 300.

In the next step, step 404, the ECU 302 determines whether the load on the engine 126 has climbed to or above a first predetermined threshold load value.

If the load on the engine 126 has climbed to or above the first predetermined threshold load value as determined in step 404, the ECU 302 executes step 406, in which the ECU 302 signals the valve driver circuit 318 to disengage the hydraulic clutch 218 and to engage the hydraulic clutch 234 substantially simultaneously.

The ECU 302 executes step 408 in which the ECU 302 signals the engine governor 300 to regulate the speed of the engine 126 at a first command speed.

After step 408, the ECU 302 loops again to step 402 and subsequently performs another cycle of the process.

On the other hand, if the ECU 302 determines in step 404 that the load on the engine 126 has not climbed to the first predetermined threshold value, then the ECU 302 executes step 410. In step 410, the ECU 302 determines whether the load on the engine 126 has fallen to or below a second predetermined threshold load value.

If the load on the engine 126 has fallen to or below the second predetermined threshold load value as determined in step 410, the ECU 302 executes step 412 in which the ECU 302 signals the valve driver circuit 318 to disengage the hydraulic clutch 234 and to engage the hydraulic clutch 218 substantially simultaneously.

The ECU 302 then executes step 414 in which the ECU 302 signals the engine governor 300 to regulate the speed of the engine 126 at a second command speed that is less than the first command speed. After step 414, the ECU 302 loops again to step 402 and repeats the process.

On the other hand, if the load on the engine 126 is not fallen to or below the second predetermined threshold value as determined in step 408, the ECU 302 loops again to step 402 and repeats the process.

Figure 5:
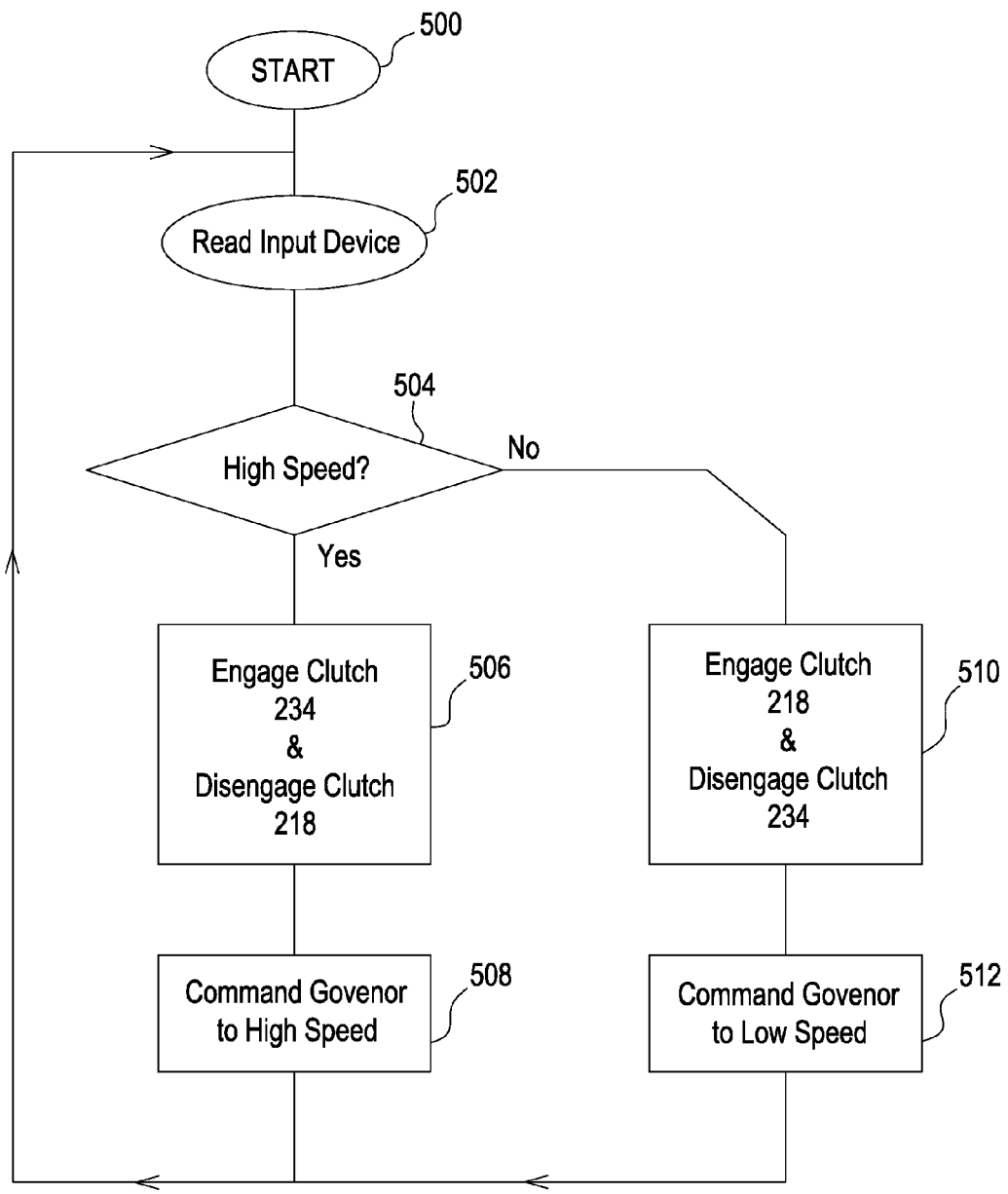
FIG. 5 is a flowchart of operation in a second, semiautomatic mode of operation.

FIG. 5 illustrates an alternative process executed by the ECU 302 in which the ECU 302 responds to the operator's manipulation of the operator input device 304.

The process begins in step 500.

In step 502, the ECU 302 reads a signal from the operator input device 304. In step 504, the ECU 302 determines whether the operator has selected a high speed of rotation for the engine 126.

If the operator has selected a high speed of rotation for the engine 126, the ECU 302 continues to step 506 in which step the ECU 302 signals the valve driver circuit 318 to engage the hydraulic clutch 234 and to disengage the hydraulic clutch 218 substantially simultaneously (if it has not done so already in a previous processing loop).

The ECU 302 then continues on to step 508 in which the ECU 302 signals the engine governor 300 to regulate the speed of the engine 126 at a high speed of rotation (a first command speed).

After executing the step 508, the ECU 302 loops again to the step 502 and repeats the cycle.

On the other hand, if the ECU 302 determines in the step 504 that the operator has not selected a high speed of rotation for the engine 126, but has instead selected a low speed of rotation for the engine 126 the ECU 302 continues on to step 510 in which it signals the valve driver circuit 318 to engage the hydraulic clutch 218 and to disengage the hydraulic clutch 234 substantially simultaneously (if it has not done so already in a previous processing loop).

The ECU 302 then continues on to step 512 in which the ECU 302 signals the engine governor 300 to regulate the speed of the engine 126 at a low speed of rotation (i.e. at a second command speed lower than the first command speed).

After executing the step 512, the ECU 302 loops again to the step 502 and repeats the process.

Figure 6:
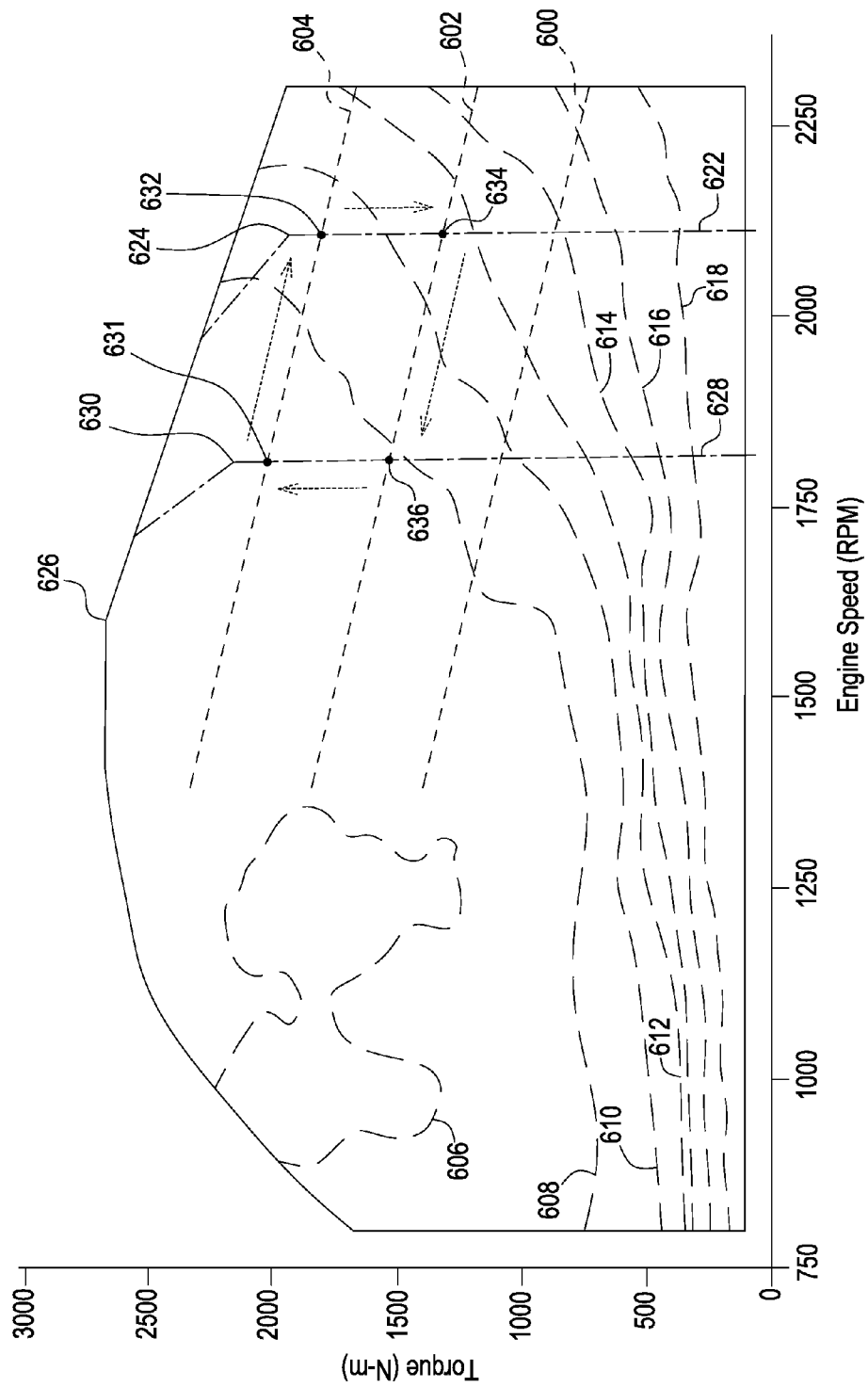
FIG. 6 is a torque/speed plot of a typical internal combustion engine for a combine harvester used to illustrate the operation of a typical engine that may be employed with the combine harvester drive system described in this application.

FIG. 6 illustrates a torque/power curve for a typical internal combustion engine such as the engine 126. In this two-dimensional plot, the torque (in Newton-meters) is plotted on the Y axis, and the engine speed (in revolutions per minute) is plotted on the x-axis.

Each point underneath the uppermost curve of this plot is a point at which the engine can be operated. At any instant, the point on the curve at which the engine 126 operates is determined by the engine governor 300. The engine governor 300 receives commands from the ECU 302 that indicate the desired speed at which the engine 126 should operate. In the present example, the engine governor 300 is configured to operate the engine 126 as long as possible at a commanded speed. This is called isochronous operation, and is typical of the governors on vehicles such as the combine harvester 102.

An equal load line 600 illustrates a constant power of 200 kW. At any point along this line, at the corresponding engine speed and the indicated torque, the engine 126 produces 200 kW of power. An equal load line 602 illustrates a constant power of 300 kW. At any point on this line, at the indicated engine speed and the indicated torque, the engine 126 produces 300 kW of power. An equal load line 604 illustrates a constant power of 400 kW. At any point on this line, at the indicated engine speed and the indicated torque, the engine 126 produces 400 kW of power.

FIG. 6 is divided into several regions outlined with dashed lines. In the innermost region, bounded by a boundary line 606 (a dashed line), the engine 126 operates at a brake specific fuel consumption (alternatively "BSFC", an inverse measure of fuel efficiency) of greater than 200 g/kW-hr. In other words, for every kilowatt hour of work the engine does in this region, the engine 126 will consume 200 gms of fuel. In the operating region bounded by the boundary line 606 and a boundary line 608 (a dashed line), the engine 126 operates at a brake specific fuel consumption of between 210 and 200 g/kW-hr. In the operating region bounded by the boundary line 608 and a boundary line 610 (a dashed line), the engine 126 is operating at a BSFC of between 220 and 210 g/kW-hr. In the region bounded by the boundary line 610 and the boundary line 612, the BSFC is between 230 and 220 g/kW-hr region. In the region bounded by the boundary line 612 and a boundary line 614 (a dashed line), the BSFC is between 240 and 230 g/kW-hr. In the region bounded by a boundary line 614 (a dashed line) and a boundary line 616 (a dashed line), the BSFC is between 250 and 240 g/kW-hr. In the region bounded by a boundary line 616 (a dashed line) and a boundary line 618 (a dashed line) the BSFC is between 260 and 250 g/kW-hr region.

The highest engine efficiency is achieved in the region bounded by the boundary line 606. The farther one travels away from this region, the lower the engine efficiency. For high fuel efficiency, the engine should be operated as close as possible to the region bounded by the boundary line 606.

The engine 126 operates most efficiently at its lowest possible BSFC. The equal load line 600, the equal load line 602, and the equal load line 604 indicate that the engine 126 can be operated at many different speeds to produce the same power and substantially the same torque.

In prior art arrangements, an engine such as the engine 126 would be operated isochronously at a speed of about 2100-2200 RPM. This line is called the "operating curve" of the engine and is controlled by the engine governor. Although it is often called a "curve" it is a line of substantially constant engine speed. In a traditional combine harvester, the operator sets the speed of the engine as fast as it will go without stalling—approximately 2100-2200 RPM. As the combine harvester climbs hills, or starts to harvest heavier crops, the governor maintains the speed substantially constant while increasing the power output and torque of the engine.

The engine governor 300 maintains the speed of engine 126 constant by increasing the fuel supplied to the engine 126 as the load on the engine increases. There is a slight droop in engine speed as the power and torque demands on the engine increase during isochronous operation. This is indicated by the slight leftward tilt of the two operating curves shown in FIG. 6. Two typical isochronous operating curves are shown in FIG. 6 as an isochronous operating curve 622 (a dash-dot line) and an isochronous operating curve 628 (a dash-dot line).

In these prior art engine/governor arrangements, if the load increases on the combine engine until it reaches an upper point near the top of the curve (indicated in FIG. 6 as an inflection point 624 and an inflection point 630 for the isochronous operating curve 622 and the isochronous operating curve 628, respectively) the governor will no longer be able to maintain the engine speed constant. At these inflection points the engine governor 300 provides close to maximum fuel to the engine. The engine begins to slow down significantly once these inflection points are reached if the load on the engine continues to increase: the slope of the operating curve gets smaller and tilts more to the left.

Ultimately, if the load on the engine increases the engine will eventually reach an stall point 626 at which point the engine is producing its uttermost maximum torque. Unless the load on the engine is immediately reduced, the engine will stall.

The traditional maximum speed engine operating curve (shown as the isochronous operating curve 622) does not define the most efficient range of operating points under all working conditions. For example, if the engine 126 is only providing 200 kW of power, one can follow the 200 kW line (the equal load line 600) from the place it intersects isochronous operating curve 622 to the left and see that another engine operating curve, (shown in FIG. 6 as the isochronous operating curve 628) could provide the same power, with greater torque, and greater fuel efficiency (as indicated by its overall lower BSFC).

Indeed, if the engine were operated using isochronous operating curve 628 at a 200 kW load instead of being operated at isochronous operating curve 622, the would decrease from about 237 g/kW-hr to about 218 g/kW-hr. This is an increase in fuel efficiency of approximately 8%.

So why do engine and governor manufacturers design their machines to operate isochronously in the region of the isochronous operating curve 622 if the isochronous operating curve 628 provides greater fuel efficiency at the same power and torque?

One reason is that if the engine is operating on the isochronous operating curve 628, and the load on the engine increases abruptly the engine is much more inclined to stall. When it operates on the isochronous operating curve 628, the engine is much closer to the stall point 626.

Once the engine reaches the stall point 626 the engine will almost immediately stop. If the engine is operating on the operating curve indicated by isochronous operating curve 628 and the load on the engine abruptly increases, many operators will not be able to respond quickly enough to prevent the engine from stalling. On the other hand, if the engine is operated on isochronous operating curve 622, and the load on the engine abruptly increases, many operators will have enough time to reduce the load on the engine before the engine stalls.

This is a reason that isochronously governed engines are typically operated at a higher-speed engine operating curve (e.g. along the isochronous operating curve 622) than at a more fuel-efficient lower-speed engine operating curve (e.g. along the isochronous operating curve 628).

By providing a system that is capable of rapidly shifting the isochronous engine operating curve from a higher-speed curve to a lower speed curve increased fuel efficiency is provided under light loads (isochronous operation along isochronous operating curve 628) while also providing stall resistance for abrupt changes in engine load (isochronous operation along isochronous operating curve 622).

We can use the illustrated embodiment of a typical engine in FIG. 6 to illustrate this general process of switching between a higher speed operating curve (isochronous operating curve 622) and a lower speed operating curve (isochronous operating curve 628) as the load on the engine changes. This process of automatic clutch engagement and disengagement and the shifting of the engine operating curve is illustrated by the following the course of the four dashed lines in FIG. 6, which mirrors the operation shown in FIG. 4 and described in the text accompanying FIG. 4.

To illustrate the operation, we must assume an initial operating point. Assume the ECU 302 has initially commanded the engine to operate isochronously at a first, lower engine speed (about 1800 RPM shown by isochronous operating curve 628 in FIG. 6). In this mode of operation, engine governor 300 maintains the speed of the engine at about 1800 RPM. The load on the engine will fluctuate up and down between an operating point 631 and an operating point 636.

The ECU 302 continually monitors signals indicative of engine load. In the example illustrated herein, the signals come from engine governor 300.

Eventually, the ECU 302 will determine that the engine load has reached a high load threshold in step 404, shown as the operating point 631 in FIG. 6.

The ECU 302 then engages hydraulic clutch 234, disengages the hydraulic clutch 218, and issues a higher engine speed operating command to the engine governor 300, which shifts the engine operating curve from isochronous operating curve 628 to isochronous operating curve 622.

The effects of these combination of steps are to keep the vehicle traveling through the field at the same ground speed, to keep the rotor rotating at the same rotational speed, to raise the engine speed by approximately 300 RPM, and to move from the operating point 631 on the low-speed engine operating curve (isochronous operating curve 628) to an operating point 632 on the high-speed engine operating curve (isochronous operating curve 622). This moves the engine operation sufficiently far from the stall point 626 to minimize the risk that an abrupt increase in engine load will cause the engine to immediately stall.

Once operation is established on the operating curve indicated by isochronous operating curve 622, the load on the engine will fluctuate up and down with the governor maintaining the engine speed along the line segment between the operating point 632 and the operating point 634.

Eventually, however, the load on the engine will fall below a minimum load (determined in step 410 in FIG. 4) shown in FIG. 6 as operating point 634. The ECU 302 will then swap the clutch engagement (i.e. hydraulic clutch 234 will be disengaged, and hydraulic clutch 218 will be engaged) and ECU 302 will automatically issue a speed command to the engine governor 300 that is reduced by 300 RPM (i.e. from 2100 to 1800 RPM).

Since engine governor 300 is an isochronous governor, the new speed command shifts the operating curve of engine 126 from operating at the operating point 634 on the operating curve indicated by isochronous operating curve 622 to operating at the operating point 636 on the operating curve indicated by isochronous operating curve 628.

A dead band is provided between the 2 shift points. The engine operating curve shifts from the lower speed curve (isochronous operating curve 628 to the higher-speed curve (isochronous operating curve 622) at a power level of about 400 kW. The engine operating curve shifts from the higher-speed curve (isochronous operating curve 622) to the lower speed curve (isochronous operating curve 628) at a power level substantially lower, around 275 kW.

Requiring a shift at two different power levels substantially reduces the amount of time the clutches spend engaging and disengaging and permits the engine to operate isochronously at one of the operating curves or the other for a significant proportion of the combine harvester operating time. The speed command and clutch downshift shift point in step 404 (the operating point 631) is preferably at least 100 kW higher than the speed command and clutch upshift shift point in step 410 (the operating point 634).

The engagement and disengagement of the hydraulic clutch 218 and the hydraulic clutch 234 can be calibrated such that the entire shift from the disengagement of one clutch to the engagement of the other can occur within an interval of less than one second. Engine governors such as engine governor 300 are also capable of changing the fuel to the engine equally fast.

To avoid stalling the vehicle when the clutches engage and disengage, and when the governor changes the engine operating curve, the two clutches and the engine speed change should be calibrated to all occur within a two second interval of time. Alternately they can be calibrated to all occur within a one second interval of time. Alternately they can be calibrated to all occur within a 750 ms interval of time. Shortening the interval in which all of the actions occur will necessitate regular calibration of the clutches by the ECU 302.

It should be recognized that every engine has a different engine operating plot (i.e. a different FIG. 6), different engine operating curves, different fuel efficiencies, different power outputs, and different torques across their operating ranges. Therefore the particular power levels, torque levels, speeds, and the like illustrated in FIG. 6 are simply exemplary in order to better understand the reasons behind the particular operation described herein. Different power levels, different torque levels, different shift points, and different speeds may be desirable for different engines and different combine harvesters.

The example provided above discusses a single ECU 302. While this arrangement is possible, it is also possible to have multiple ECUs each providing some of the functions described above and that are connected together in a network of ECUs.

As just one example of an alternative configuration with multiple ECUs 302, one ECU 302, for example, is coupled to one or both of the hydraulic clutch 218 and the hydraulic clutch 234. Another ECU 302, for example, is coupled to the engine governor 300. Yet another ECU 302 is coupled to the operator input device 304. All of these ECUs are joined together in a network such as a CANbus in accordance with the SAE 31939 standard. Each of these ECUs 302 are individually configured to collectively provide the functions of controlling the governor and selectively engaging and disengaging the hydraulic clutch 218 and the hydraulic clutch 234 in the manner described herein to shift between two isochronous engine operating curves. Therefore the term "ECU" as used herein refers to either one ECU or a plurality of ECUs connected together in a network.

The load on the engine is indicated by any signal or combination of signals (including, without limitation, engine speed, engine fuel consumption, engine torque, engine power output) that indicate how hard the engine is working, and thus, how close the engine is to stalling. Some governors (such as engine governor 300) provide one, more than one, or all of these signals.

Any of these signals (either alone or in combination with others) can indicate the load on the engine. furthermore, signals can be provided to ECU 302 from other sources than a governor, such as a torque sensor mounted on transmission shaft, driveshaft, crankshaft, or other shaft conveying power from the engine to the gearbox, or from the gearbox to the other driven elements.

Another sensor that can be used alone or together with other sensors to provide a signal indicative of engine load is a sensor indicating the fuel consumption rate of the engine 126.

Another sensor that can be used alone or together with other sensors to provide a signal indicative of engine load is up sensor indicating the speed of rotation of the engine, a transmission shaft, a driveshaft, a crankshaft, or other rotating shaft driven by the engine.

In the examples illustrated herein, two operating curves were selected, one operating curve at about 2100 RPM and another operating curve it 1800 RPM. These specific speeds are illustrative, not required. Every engine is different and may have preferred speeds of operation that are different than those described herein.

We claim:

1. A combine harvester (102) drive system, comprising:
   an engine (126);
   a engine governor (300) coupled to the engine (126) to control a speed of the engine (126) based upon a speed signal;
   a first clutch (218) coupled to the engine (126) to be driven by the engine (126);
   a second clutch (234) coupled to the engine (126) in parallel to the first clutch (218) to be driven by the engine (126);
   a threshing rotor (108) coupled to the first clutch (218) and the second clutch (234) to be driven thereby; and
   an ECU (302) coupled to the first clutch (218) and the second clutch (234) to selectively engage and disengage the first clutch (218) and the second clutch (234), and coupled to the engine governor (300) to transmit a speed command to the engine governor (300), and wherein the ECU (302) is configured to engage one of the first clutch (218) and the second clutch (234) and to disengage the other of the first clutch (218) and the second clutch (234) when the engine (126) reaches a first predetermined load level.

2. The combine harvester (102) drive system of claim 1, wherein the first clutch (218) and the second clutch (234) are disposed inside a gearbox (128).

3. The combine harvester (102) drive system of claim 1, wherein the engine governor (300) is configured to isochronously control the engine (126) over a range of operating loads.

4. The combine harvester (102) drive system of claim 3, wherein the engine governor (300) is configured to receive the speed signal from the ECU (302).

5. The combine harvester (102) drive system of claim 1, wherein the ECU (302) is configured to command one of the first clutch (218) and the second clutch (234) to engage and to command another of the first clutch (218) and the second clutch (234) to disengage, and to command the engine governor (300) to change the speed of the engine (126) by at least 200 RPM, at predetermined intervals such that the first clutch (218) engaging, the second clutch (234) disengaging, and the changing of the speed of the engine (126) occur within a two second interval.

6. The combine harvester (102) drive system of claim 1, further comprising an operator input device (304) coupled to the ECU (302).

7. The combine harvester (102) drive system of claim 6, wherein the ECU (302) is configured to command an engagement of the first clutch (218), to command a disengagement of the second clutch (234), and to command the engine governor (300) to decrease a speed of the engine (126) upon operator manipulation of the operator input device (304).

8. The combine harvester (102) drive system of claim 7, wherein the ECU (302) is configured to command a disengagement of the first clutch (218), to command an engagement of the second clutch (234), and to command the engine governor (300) to increase the speed of the engine (126) upon operator manipulation of the operator input device (304).

9. The combine harvester (102) drive system of claim 1, wherein the ECU (302) is configured to automatically and periodically monitor an engine load condition.

10. The combine harvester (102) drive system of claim 9, wherein the ECU (302) is configured (1) to engage the second clutch (234) and (2) to disengage the first clutch (218) and (3) to transmit a first speed command to the engine governor (300) commanding the engine governor (300) to increase the engine (126) speed, in response to the ECU (302) determining that the engine load condition has exceeded a first threshold engine load condition.

11. The combine harvester (102) drive system of claim 10, wherein the ECU (302) is configured (1) to disengage the second clutch (234) and (2) to engage the first clutch (218) and (3) to transmit a second speed command to the engine governor (300) to decrease the engine (126) speed, in response to the ECU (302) determining that the engine load condition has dropped below a second threshold engine load condition.

12. The combine harvester (102) drive system of claim 11, wherein the first threshold engine load condition is indicative of a higher engine load than the second threshold engine load condition.

13. The combine harvester (102) drive system of claim 11, wherein the first speed command indicates an engine speed higher than the engine speed indicated by the second speed command.

14. A method of operating a combine harvester (102) drive system of a combine harvester having an engine (126) controlled by a engine governor (300) configured to operate the engine isochronously, the combine harvester (102) further having a threshing rotor (108) coupled to the engine (126), the combine harvester further having first power transmission path coupling the engine (126) to the threshing rotor (108) in a first ratio of rotational speed of the engine (126) and rotational speed of the threshing rotor (108), and a second power transmission path coupling the engine (126) to the threshing rotor (108) in a second ratio of rotational speed of the engine (126) and rotational speed of the threshing rotor (108) wherein the first ratio of rotational speed is different from the second ratio of rotational speed, and further wherein ECU (302) is coupled to the engine governor (300), the method comprising steps of:
the ECU (302) automatically and periodically determining an engine load condition;
the ECU (302) automatically and periodically determining whether the engine load condition has reached a first threshold engine load condition; and
the ECU (302) switching from the first power transmission path to the second power transmission path when the engine load condition reaches the first threshold engine load condition.

15. The method of operating a combine harvester (102) drive system of claim 14, further comprising a step of:
the ECU (302) transmitting a first engine speed command to the engine governor (300) substantially simultaneously with the step of switching from the first power transmission path to the second power transmission path.

16. The method of operating a combine harvester (102) drive system of claim 15, further comprising steps of:
the ECU (302) automatically and periodically determining whether the engine load condition has reached a second threshold engine load condition; and
the ECU (302) switching from the second power transmission path to the first power transmission path when the engine load condition reaches the second threshold engine load condition.

17. The method of operating a combine harvester (102) drive system of claim 16, further comprising a step of:
the ECU (302) transmitting a second engine speed command to the engine governor (300) substantially simultaneously with the step of switching from the second power transmission path to the first power transmission path.

* * * * *